United States Patent [19]

Miyatuka et al.

[11] Patent Number: 4,465,737

[45] Date of Patent: Aug. 14, 1984

[54] MAGNETIC RECORDING MEDIUM

[75] Inventors: Hajime Miyatuka; Akira Kasuga; Akihiro Matsufuji; Tsutomu Sugisaki, all of Kanagawa, Japan

[73] Assignee: Fuji Photo Film Co., Ltd., Kanagawa, Japan

[21] Appl. No.: 462,179

[22] Filed: Jan. 31, 1983

[30] Foreign Application Priority Data

Jan. 29, 1982 [JP] Japan .................................. 57-12894

[51] Int. Cl.$^3$ .............................................. H01F 10/02
[52] U.S. Cl. .................................... 428/339; 428/402; 428/457; 428/695; 428/900
[58] Field of Search ................................ 427/127–132, 427/48; 428/900, 694, 695, 329, 336, 339, 402, 457

[56] References Cited

U.S. PATENT DOCUMENTS 3,790,407  2/1974  Merten .............................. 252/62.54

Primary Examiner—Bernard D. Pianalto

Attorney, Agent, or Firm—Sughrue, Mion, Zinn, Macpeak and Seas

[57] ABSTRACT

A magnetic recording medium is disclosed. The medium is comprised of a support having a magnetic layer coated thereon. The magnetic layer is comprised of a ferromagnetic metal powder and a binder. The ferromagnetic metal powder has a specific surface area of not less than 30 m$^2$/g. The magnetic layer is further comprised of a fatty acid and a fatty acid ester in a total amount of 2 to 10 wt % based on the weight of the ferromagnetic metal powder. The proportion of the fatty acid ester is 15 to 60 wt % based on the total weight of the fatty acid and the fatty acid ester. The surface roughness of the magnetic layer is not more than 0.03$\mu$. The recording medium has excellent video characteristics obtained by the use of fine metal particles having the disclosed specific surface area and by increasing the surface properties of the magnetic layer so that spacing loss between the recording or reproducing head and the recording tape is decreased and output level is increased and modulation noise is decreased so that the video S/N is increased.

10 Claims, No Drawings

MAGNETIC RECORDING MEDIUM

FIELD OF THE INVENTION

The present invention relates to a magnetic recording medium and, more particularly, it relates to a magnetic recording tape using a metal powder as a ferromagnetic powder and having improved video characteristics.

BACKGROUND OF THE INVENTION

Magnetic recording media are generally composed of a magnetic layer containing a ferromagnetic powder and a binder as main components. The magnetic layer is coated on a non-magnetic support such as polyethylene terephthalate film, polycarbonate film or polyimide film.

The ferromagnetic powders used are iron oxide powders and metal powders. The metal powders are used to increase the magnetic recording density and output level and provide more saturation magnetization and coercivity.

The so-called "metal tape" magnetic recording media have been practically researched particularly with respect to video recording systems because they have higher recording density than that of iron oxide recording tapes. For example, small VTR systems which are associated with a camera have been proposed and the metal tape is employed in the systems, which require two or more times the recording density required of VHS systems and $\beta$-systems, a half diameter of head cylinder and a half relative speed of head/tape less than the present systems. Accordingly, the recording wave length is half that of present tapes which appears to be about $0.6\mu$ to about $1\mu$.

In such new systems, recording and reproducing images of the same or better quality than those of present systems are required under the above conditions. Therefore, the C/N ratio of magnetic recording medium in the new systems must be not less than 6 dB which is higher than that of magnetic recording medium in the VHS/$\beta$-systems where they are evaluated under the same conditions. The C/N ratio means a ratio of output level of the reproducing signal to the modulation noise when a FM carrier wave is recorded.

A magnetic recording medium must satisfy various conditions in order to achieve the above requirements, and must also eliminate various problems.

Because the recording density is higher and the recording wave length ($\lambda$) is shorter, the spacing loss that is the clearance (g) between the tape and head should preferably be smaller. Therefore, it is preferred if the magnetic layer has improved surface properties. However, if the surface properties are better and hence the magnetic layer has a smooth surface, the tape can not stably run because due to high contact resistance with the guiding rolls of a VTR apparatus, or resistance with the head cylinder and devices in the cassette. The unstable running property of tapes decreases the image quality and makes the tape abrasive which causes problems in the durability of tapes.

The output level in short wave length recording has no spacing loss problems due to the use of ferromagnetic metal powder. It is necessary not to simultaneously increase the noise in order to guarantee the image quality of reproduced images. A magnetic layer having better surface properties or a smooth surface is more advantageous to decrease noise, and uniform dispersion of ferromagnetic powders is important to the surface property.

A magnetic layer having better surface properties, stable running properties and better durability is necessary to obtain metal tapes having better video characteristics in high recording density using a recording wave length of not more than $1\mu$. Therefore, novel technics other than VHS and $\beta$-type iron oxide magnetic recording tapes are needed to develop magnetic recording tapes satisfying the above conditions.

SUMMARY OF THE INVENTION

A first object of the present invention is to provide a magnetic recording medium having excellent video characteristics.

A second object of the present invention is to provide a magnetic recording medium having good running properties.

A third object of the present invention is to provide a magnetic video recording medium having good durability.

The present inventors have found, as a result of various research, that the above objects of the present invention can be achieved by using a magnetic layer containing a ferromagnetic metal powder having not less than $30 \text{ m}^2/\text{g}$ of specific surface area, and a fatty acid and a fatty acid ester in an amount of 2 to 10 wt% based on the ferromagnetic metal powder, in which the amount of fatty acid ester is 15 to 60 wt% based on the total amount of the fatty acid and fatty acid ester, and having a surface roughness of not more than $0.03\mu$.

DETAILED DESCRIPTION OF THE INVENTION

The method of preparing the ferromagnetic metal powder which is used in this invention is not limited, and any of the following methods can be used.

(1) A method which comprises thermal-decomposing an organic acid salt of ferromagnetic metal and reducing it with a reducing gas, as disclosed in U.S. Pat. Nos. 3,574,683 and 3,574,685.

(2) A method which comprises reducing an acicular oxyhydroxide which can include one or more other metals or an acicular iron oxide obtained from the oxyhydroxide, as disclosed in U.S. Pat. Nos. 3,607,219 and 3,702,270.

(3) A method which comprises evaporating a ferromagnetic metal in an inert gas under low pressure, as disclosed in Japanese Patent Publication Nos. 15320/74 and 18160/74.

(4) A method which comprises thermal-decomposing a metal carbonyl compound, as disclosed in U.S. Pat. Nos. 3,172,776, 3,200,007 and 3,228,882.

(5) A method which comprises electrically separating a ferromagnetic metal powder using a mercury cathode and then separating it from the mercury, as disclosed in U.S. Pat. Nos. 3,156,650 and 3,262,812.

(6) A method which comprises reducing a ferromagnetic metal salt by adding a reducing agent (for example, borohydride compounds, hypophosphites and hydrazine compounds, etc.) in a solution of the ferromagnetic metal salt, as disclosed in U.S. Pat. Nos. 3,669,642, 3,672,867 and 3,726,664.

Of these methods, methods (2), (3) and (6) are preferred and method (2) is particularly preferred because it is the most practical from the point of cost and quality. Further, it is preferred that surfaces of the metal particles are coated with an oxidized shell to improve chemical stability in preparing the ferromagnetic metal powder used in the present invention, as disclosed in Japanese Patent Publication No. 3862/60.

Ferromagnetic metal powders used in connection with the present invention include pure iron (Fe) and alloys such as Fe—Ni or Fe—Ni—Co which can contain a non-magnetic or non-metallic element such as B, C, N, Al, Si, P, S, Ti, Cr, Mn, Cu or Zn in a small amount. The particle size of the metal particles is not particularly important because globular particles which are several hundred angstrom in size are connected with each other to make a necklace form or because the shape of the metal particles is in the form of skeleton of acicular iron oxide particles.

The present inventors have found that the specific surface area of the ferromagnetic metal powders measured by a nitrogen gas adsorption method according to a BET method is an important factor with respect to achieving the objects of the present invention. The specific surface area of the ferromagnetic metal powder is not less than 30 m$^2$/g, preferably not less than 35 m$^2$/g, more preferably not less than 40 m$^2$/g. Where the specific surface area is too small, a sufficient output level is not obtained and noise increases, whereby excellent video characteristics are not attained. The coercive force (Hc) of the ferromagnetic metal powder is 1000 to 2000 Oe, and the saturation magnetization ($\sigma$s) is not less than 120 emu/g, preferably 130 emu/g or more.

Another important feature of the present invention involves the use of a fatty acid and a fatty acid ester. The total amount of the fatty acid and the fatty acid ester is about 2 to about 10 wt%, preferably 2.5 to 9 wt%, more preferably 3 to 8 wt% based on the ferromagnetic metal powder. The proportion of the fatty acid ester is about 15 to about 60 wt%, preferably 20 to 55 wt%, more preferably 25 to 50 wt% based on the total amount of the fatty acid and the fatty acid ester.

If the total amount of fatty acid and fatty acid ester is less than about 2 wt% based on the ferromagnetic metal powder, the desired running properties of the recording medium can not be maintained. If the ratio of the fatty acid ester to the fatty acid is less than about 15 wt%, the durability of the magnetic layer in a still mode for watching still images can not be maintained. Further, if the proportion of the fatty acid ester is more than 60 wt%, the magnetic layer is scraped off which causes head clogging or "stick slip behavior", whereby the recording medium does not move in a normal manner. [The term "stick slip behavior" is defined in D. H. Buckley, "Surface Effects in Adhesion, Friction, Wear and Lubrication", pages 363 and 374, Elsevier Scientific Publishing Corp. (1981).]

The fatty acid which can be used in the present invention includes a saturated fatty acid such as palmitic acid, stearic acid, myristic acid or lauric acid; an unsaturated fatty acid such as oleic acid; and a fatty acid having an alkyl group in a side chain.

The fatty acid ester which can be used in the present invention includes an ester formed by esterification reaction from the above fatty acid with a straight chain alcohol having 2 or more carbon atoms such as ethyl, butyl, amyl or octyl; an alkyl alcohol having a side chain such as 2-ethylhexyl or 2-heptylundecyl; and an alcohol having an ether bond such as butoxyethyl.

Of the fatty acids and fatty acid esters, palmitic acid, stearic acid, myristic acid, oleic acid, amyl stearate, butyl stearate, butoxyethyl stearate and ethyl stearate are preferred.

Another important feature of the present invention is that the surface property of the magnetic layer is above certain level. According to the experiments of the inventors, this level is not more than 0.03$\mu$, preferably not more than 0.025$\mu$, more preferably not more than 0.02$\mu$ of surface roughness measured by a center line average roughness at 0.25 mm of cut-off value defined in JIS-B 0601, paragraph 5. It is possible to increase the surface property of the magnetic layer and achieve the objects of the present invention by selecting the conditions of the dispersing step of the ferromagnetic metal powders and molding step, if the specific surface area of magnetic layer is within the above range, i.e., not less than 30 m$^2$/g.

As the surface roughness of magnetic layer increases, it becomes more difficult to increase the output level due to the influence of spacing loss. Further, it becomes more difficult to increase the video S/N ratio because the noise increases. As the surface property is improved and the surface roughness is decreased, the running property of the magnetic recording medium is decreased because the coefficient of friction of the magnetic layer with respect to devices in the cassette and the VTR apparatus is increased.

The ferromagnetic powder of the invention is mixed with a binder to prepare a magnetic coating composition. The binder used in the invention is not limited and can include a thermoplastic resin, a thermosetting resin, a reactive resin and a mixture thereof. Examples of the binder include thermoplastic resins such as vinyl chloridevinyl acetate copolymers, vinyl chloride-vinylidene chloride copolymers, vinyl chloride-acrylonitrile copolymers, acrylic acid ester-acrylonitrile copolymers, acrylic acid ester-vinylidene chloride copolymers, methacylic acid ester-acrylonitrile copolymers, methacrylic acid ester-vinylidene chloride copolymers, methacrylic acid esterstyrene copolymers, urethane elastomers, butadiene-acrylonitrile copolymers, polyamide resins, polyvinyl butyral, cellulose derivatives, styrene-butadiene copolymers, polyester resins, various synthetic rubbers; thermosetting resins or reactive resins such as phenol-formalin resins, formaldehyde resins, urea resins, melamine resins, alkyd resins, epoxy resins and various hardening agents, isocyanate hardenable resins and polyisocyanate prepolymers. Preferred examples of the binder are vinyl chloride-vinyl acetate copolymers and styrene-butadiene copolymers. The mixing ratio of the magnetic powder and the binder is 100:8 to 100:25, preferably 100:15 to 100:24, by weight.

The magnetic layer of the present invention may contain a lubricant such as a silicone oil (e.g., polysiloxane), an inorganic powder (e.g., graphite, molybdenum disulfide), a plastic fine particle (e.g., polyethylene, polytetrafluoroethylene) or fluorocarbons; an abrasive such as fused alumina, carbon silicate, chromium dioxide ($Cr_2O_3$), corundum or diamond; and an organic solvent such as ketones (e.g., methyl ethyl ketone, cyclohexanone), alcohols, esters (e.g., ethyl acetate, butyl acetate), aromatic solvents (e.g., benzene, toluene, xylene) and chlorinated hydrocarbons (e.g., carbon tetrachloride, chloroform).

The non-magnetic support used in the present invention may be comprised of a synthetic resin such as polyester, vinyl type polymer or cellulose derivative, a non-magnetic metal or paper, preferably a polyester. The shape of the support may be film, tape or sheet.

A magnetic layer coated on a support is subjected to smoothening treatment (e.g., smoothening treatment before drying or calendering after drying) to increase the magnetic properties such as the S/N ratio.

Additives, supports and methods for preparing magnetic recording media as described above are disclosed in U.S. Pat. No. 4,135,016. According to the present invention, it is possible to obtain a metal recording tape having excellent video characteristics. That is, by using fine metal particles having more specific surface area and by increasing the surface property of the magnetic layer, spacing loss between the recording or reproducing head and the recording tape can be decreased, decrease in the output level can be prevented and modulation noise can also be decreased, whereby the video S/N is increased.

The particle size of the metal powder used in the magnetic layer of the present invention is not particularly restricted because the starting material iron oxide metal powder may have an acicular shape, may be a chain of globular particles or may include pores which are generated during a dehydration step in the preparation of metal powder. According to the research of the present inventors, it has been confirmed that the specific surface area has a more intimate relationship with characteristics of the magnetic layer than the particle size of metal powder.

The video characteristics can be maintained by selecting ferromagnetic metal powders and controlling the surface property of the magnetic layer. However, the running property of thus obtained magnetic recording tape in a VTR is decreased. Further, if the magnetic powder having a high specific surface area is selected, the tolerance of the magnetic layer is decreased and the output level is decreased due to head clogging and the magnetic layer can be broken using the still mode of the VTR. These problems can be eliminated by adding a fatty acid and a fatty acid ester to the magnetic layer. That is, according to the present invention, a ferromagnetic metal tape having excellent running property and durability and high video characteristics can be obtained.

The present invention will be explained in more detail by the following Examples. However, the scope of the invention is not limited to these examples. In the Examples, all parts are by weight.

EXAMPLE 1

Acicular α-FeOOH containing 5 wt% of cobalt was thermally decomposed to provide α-Fe$_2$O$_3$ which was then reduced with hydrogen to obtain a black ferromagnetic metal powder. The powder was gradually oxidized before it was removed from the reaction vessel by gradually increasing the partial pressure of oxygen. The magnetic properties and specific surface areas of the resulting powder are shown in Table 1. The specific surface area were changed by selecting synthetic conditions of acicular α-FeOOH.

TABLE 1

| Ferromagnetic Metal Powder | Hc (Oe) | σs (emu/g) | Specific Surface Area (m$^2$/g) |
| --- | --- | --- | --- |
| A | 1350 | 130 | 25 |

TABLE 1-continued

| Ferromagnetic Metal Powder | Hc (Oe) | σs (emu/g) | Specific Surface Area (m$^2$/g) |
| --- | --- | --- | --- |
| B | 1380 | 138 | 33 |
| C | 1550 | 128 | 46 |
| D | 1490 | 132 | 52 |
| E | 1330 | 136 | 22 |

To 300 parts of the above ferromagnetic metal powder, the following composition was added and the mixture was kneaded for 10 hours in a ball mill.

| | |
| --- | --- |
| Polyester type polyurethane (reaction product of ethylene adipate and 2,4-trilene-diisocyanate; average molecular weight: about 130,000) | 35 parts |
| Vinyl chloride-vinyl acetate-maleic anhydride copolymer (content of maleic anhydride: 3.0 wt. %; polymerization degree: about 400) | 30 parts |
| α-Alumina | 15 parts |
| Carbon black | 3 parts |
| Butyl acetate | 300 parts |
| Methyl isobutyl ketone | 300 parts |

After dispersing the composition, a fatty acid (3 parts of oleic acid and 3 parts of palmitic acid) and a fatty acid ester (4 parts of amyl stearate) were added to each of the Examples, and then the composition was kneaded for an additional 15 to 30 minutes. Further, 75 wt% of an ethyl acetate solution containing 22 parts of a triisocyanate compound (an adduct of 3 mol trilenediisocyanate and 1 mol trimethylolpropane; molecular weight: about 760; NCO content: 13.3 wt%; trade name "Desmodule L-75" manufactured by Bayer A.G.) was added thereto and the mixture was dispersed for 1 hour with a high speed sharing force to provide a magnetic coating composition. The coating composition was coated on a polyethylene terephthalate film having a thickness of 14.5μ in a dry thickness of 4.0μ.

The magnetic layer was subjected to magnetic orientation in a direct current magnetic field, and dried by hot air at 100° C. After drying, the magnetic layer was subjected to calendering and then slit into ½ inch widths to obtain a video recording tape, in which the final thickness of the magnetic layer was 3.4μ.

The magnetic properties were measured by a vibration sample magnetometer (trade name "VSM-III" manufactured by Toei Kogyo Co., Ltd.).

The video characteristics were measured by a VHS type VTR (trade name: "NV 8200" manufactured by Matsushita Electric Industries Co., Ltd.) where the recording and reproducing head was replaced by a sendust alloy head. The video characteristics were determined in terms of the reproducing output level at 4 MHz. The standard recording tape was Fuji video cassette T-120 E manufactured by Fuji Photo Film Co., Ltd. The characteristics of the tapes are shown in Table 2 with respect to the surface roughness, magnetic properties and electromagnetic properties.

TABLE 2

| | Powder Sample | Surface Roughness (μ) | Hc (Oe) | Br (Gauss) | Squareness Ratio | Video Output (dB) | C/N (dB) |
| --- | --- | --- | --- | --- | --- | --- | --- |
| Comparative Example 1 | A | 0.031 | 1220 | 3100 | 0.81 | +8 | +5.5 |

TABLE 2-continued

| | Powder Sample | Surface Roughness ($\mu$) | Hc (Oe) | Br (Gauss) | Squareness Ratio | Video Output (dB) | C/N (dB) |
|---|---|---|---|---|---|---|---|
| Example 1 | B | 0.027 | 1250 | 3500 | 0.78 | +10 | +7.5 |
| Example 2 | C | 0.024 | 1410 | 3200 | 0.75 | +10 | +8 |
| Example 3 | D | 0.020 | 1310 | 3300 | 0.74 | +11 | +9.5 |
| Comparative Example 2 | E | 0.039 | 1150 | 3300 | 0.83 | +8 | +5.0 |

Head: sendust head (track width: 50$\mu$; gap: 0.35$\mu$)

Surface roughness: the value measured by a center line average roughness at 0.25 mm of cut-off value defined in JIS-B 0601.

Video output: reproducing output level of signal at 4 MHz.

C/N: ratio of output at 4 MHz to modulation noise at 3 MHz when a carrier signal of 4 MHz was recorded.

Examples 1 to 3 provided high values over 6 dB, but Comparative Examples 1 to 2 did not reach even 6 dB. The running property was good and was not accompanied by "stick slip behavior". Further, where images were reproduced in the still mode of the VTR, image reproduction was possible for more than 30 minutes.

COMPARATIVE EXAMPLE 3

The same procedure as described in Example 2 was repeated except that 1 part of oleic acid, 1 part of palmitic acid and 2 parts of amyl stearate were used to provide a magnetic tape. The recording tape caused "stick slip behavior" in the VTR apparatus.

COMPARATIVE EXAMPLE 4

The same procedure as described in Example 2 was repeated except that 3 parts of oleic acid, 5 parts of palmitic acid and 1 part of amyl stearate were used to provide a magnetic recording tape.

Image reproduction of the tape was impossible in the still mode of the VTR apparatus, and head clogging was caused in 1 to 2 minutes.

COMPARATIVE EXAMPLE 5

The same procedure as described in Example 2 was repeated except that the time during which the ball mill was used was only 8 hours to provide a magnetic recording tape.

The surface roughness of the recording tape was 0.038$\mu$ and the video output level and C/N were markedly lowered (3 to 4 dB).

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising:
    a support having coated thereon;
    a magnetic layer containing a ferromagnetic metal powder and a binder;
    wherein said ferromagnetic metal powder has a specific surface area of not less than 30 m$^2$/g, said magnetic layer containing a fatty acid and a fatty acid ester in a total amount of 2 to 10 wt% based on the ferromagnetic metal powder, wherein the proportion of the fatty acid ester is 15 to 60 wt% based on the total amount of the fatty acid ester and fatty acid, and further wherein the magnetic layer has a surface roughness of not more than 0.03$\mu$.

2. A magnetic recording medium as claimed in claim 1, wherein the total amount of the fatty acid and fatty acid ester is within the range 2.5 to 9 wt% based on the weight of the ferromagnetic metal powder.

3. A magnetic recording medium as claimed in claim 2, wherein the total amount of the fatty acid and fatty acid ester is within the range of 3 to 8 wt% based on the weight of the ferromagnetic metal powder.

4. A magnetic recording medium as claimed in claim 1, wherein the amount of the fatty acid ester is within the range of 20 to 55 wt% based on the total weight of the fatty acid and fatty acid ester.

5. A magnetic recording medium as claimed in claim 4, wherein the amount of the fatty acid ester is within the range of 25 to 50 wt% based on the weight of the total of the fatty acid and the fatty acid ester.

6. A magnetic recording medium as claimed in claim 1, wherein the surface roughness of the magnetic layer is not more than 0.025$\mu$.

7. A magnetic recording medium as claimed in claim 6, wherein the surface roughness of the magnetic layer is not more than 0.02$\mu$.

8. A magnetic recording medium as claimed in claim 1, wherein the mixing ratio of the magnetic powder to the binder is within the range of 100:8 to 100:25 parts by weight.

9. A magnetic recording medium as claimed in claim 1, wherein the surface roughness of the magnetic layer is not less than 35 m$^2$/g.

10. A magnetic recording medium as claimed in claim 9, wherein the surface roughness of the magnetic layer is not less than 40 m$^2$/g.

* * * * *